Patented Feb. 22, 1944

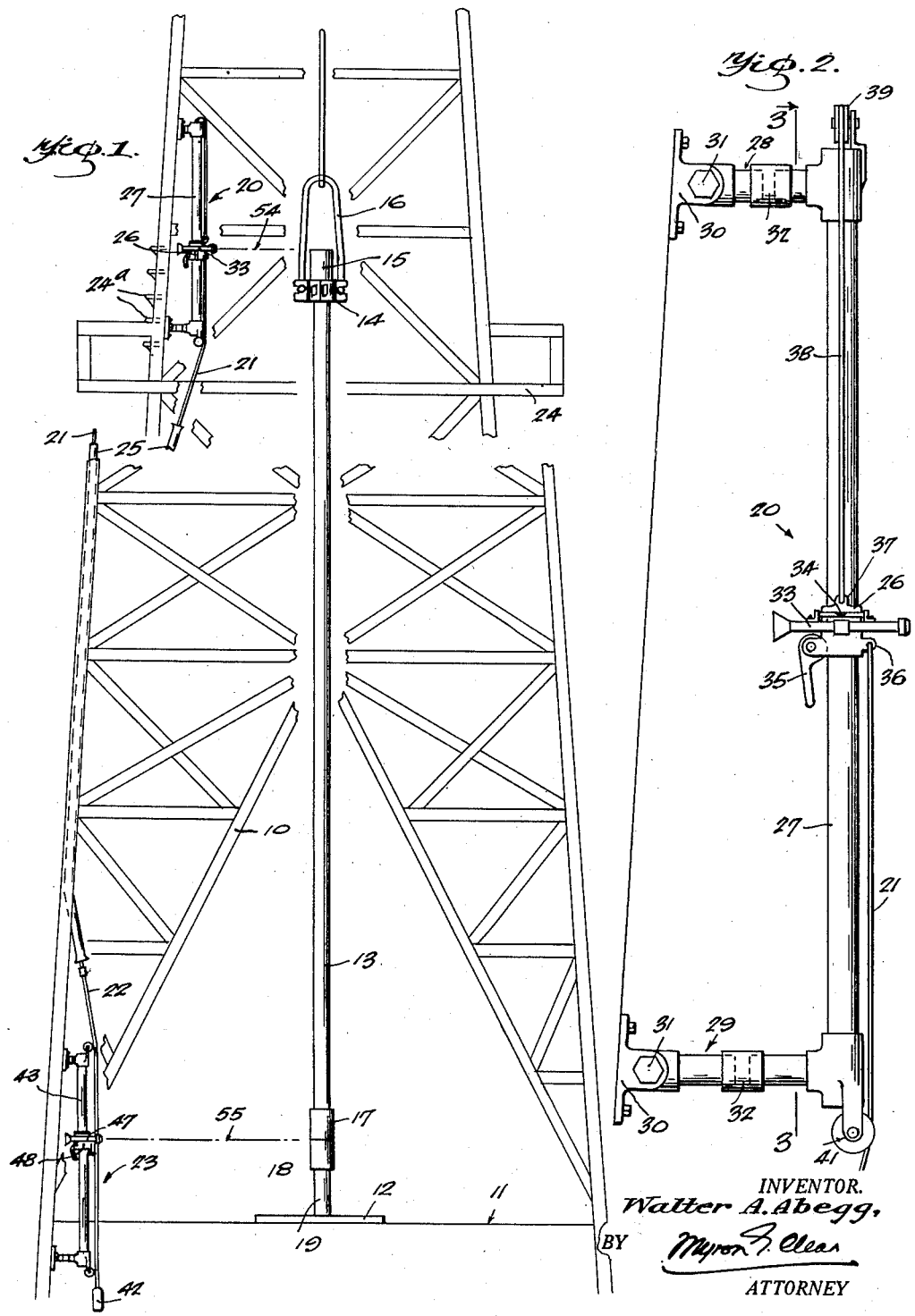

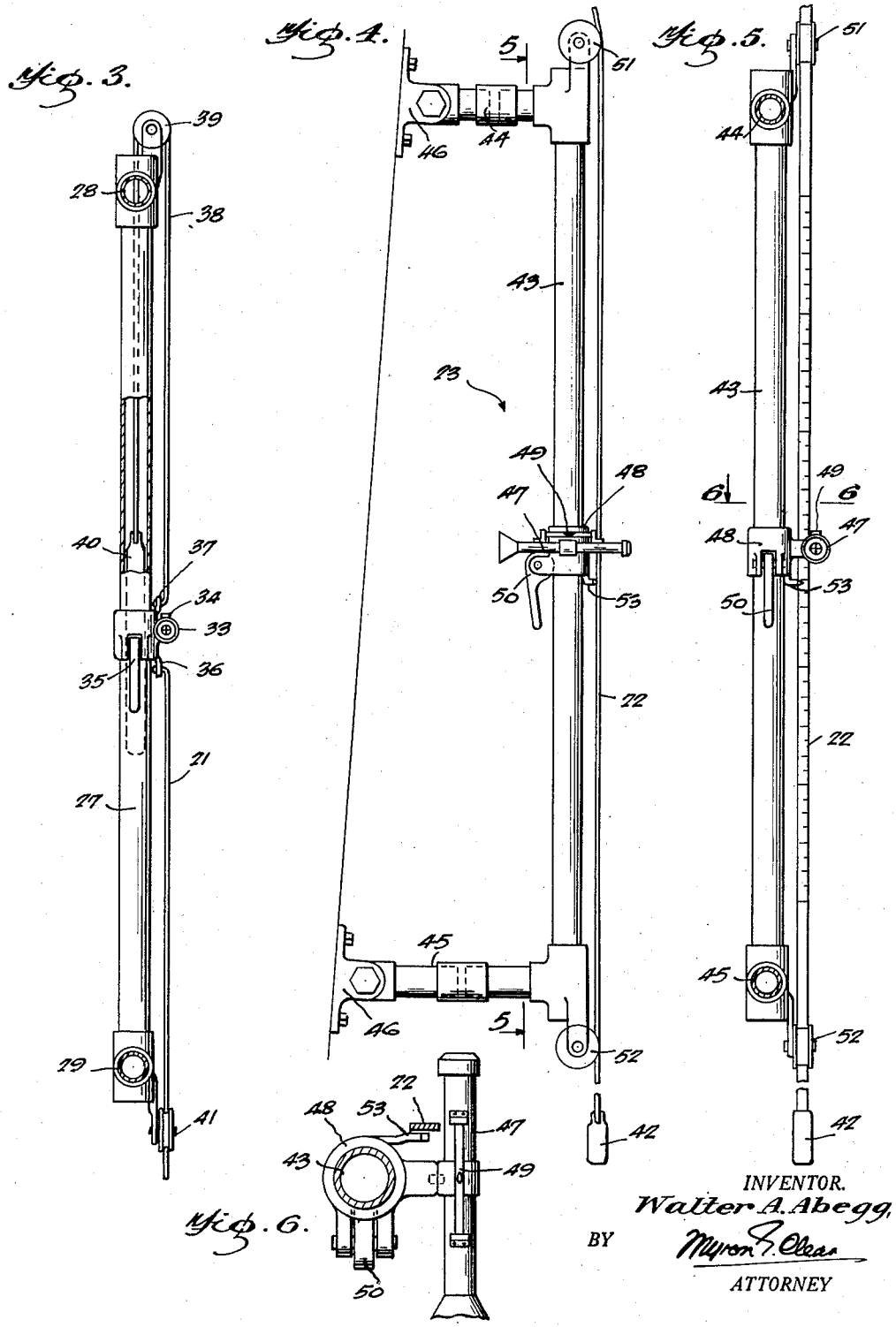

2,342,234

UNITED STATES PATENT OFFICE 2,342,234

PIPE MEASURING APPARATUS

Walter A. Abegg, Los Angeles, Calif., assignor to Abegg & Reinhold Co. Ltd., Los Angeles, Calif., a corporation of California Application August 16, 1943, Serial No. 498,774

8 Claims. (Cl. 33—137)

The present invention relates generally to pipe measuring apparatus, and more particularly to an apparatus for this purpose, adapted to be used in a practical, efficient manner in connection with an oil well derrick for accurately measuring pipe when going into, and coming out of, the hole, with the pipe under stretch, to permit of accurate determination, as well as the maintenance of a constant record, of the full length of the pipe string in use.

It has long been difficult to accurately determine the exact position, below the surface, of a bit at the lower end of a drill string, especially in the drilling of deep wells, since it must be appreciated that, on account of its great length and weight, and the consequent load on, and stretch of, the drill string, its total length in the hole is substantially greater than the sum of the normal lengths of the many connected stands of pipe which make up the drill string. This is especially true in present-day deep holes and present-day use of heavy drilling bits at the lower end of the string and long, heavy drill collars such as are commonly used immediately above the bit for stability of the drill string.

It is generally agreed that measuring of detached lengths or stands of pipe on the rack in the derrick is overly subject to inaccuracy because in so doing the stretch of the pipe is neglected. Furthermore, though this practise is used in many instances at present, the measuring tapes, especially fabric tapes, which must be held at the upper ends thereof, by the derrickman, against the upper ends of the stands, and at the lower ends thereof, by an operator on the derrick floor, against the lower ends of the stands, are soon twisted and kinked, and very frequently are inaccurately placed and read. Then, too, the tapes as so used cannot well be bowed in agreement with the bow of the inclined pipe lengths standing in the rack.

It has been suggested to use such tapes on hanging pipe lengths or stands, but while this takes care of the stretch of the pipe, it still requires a manual handling of the tape itself, with the foregoing disadvantages, and is complicated by the fact that the tape must be applied to the pipe at a time when the latter is supported in hanging position by an elevator in engagement therewith and extending therearound beneath the upper box collar of the pipe.

It is the primary object of the present invention to provide a practical, efficient pipe measuring apparatus capable of doing away with the above disadvantages and inaccuracies, which is mounted in the derrick and adapted to function in a position sufficiently removed from the hanging pipe as to avoid interference with normal well operations, and remain as a part thereof, available at all times for use and inspection above ground.

A further object of the invention is the provision of a practical, efficient measuring device or apparatus for use in connection with a well derrick, which will obviate known difficulties and disadvantages, and which may be employed with equal accuracy and effect during the lowering and the raising of the pipe string, so that accuracy of measurements may be checked going into, and coming out of, the hole, and either in the same or in different hands.

A still further object is to provide an apparatus for the above purpose which will be simple and easy to operate in the hands of unskilled help; which may be readily and easily installed; which will be rugged and durable in use, and which will promote definitely accurate results.

In the accompanying drawings, illustrating a proposed mechanism for carrying the invention into practical effect, and which forms a part of this specification—

Figure 1 is an elevation of portions of an oil well derrick, equipped as proposed by this invention, with parts broken away.

Figure 2 is a side elevation, in detail and enlarged, of the upper measuring mechanism shown in Figure 1.

Figure 3 is a vertical longitudinal sectional view through the upper measuring mechanism of Figure 2, taken substantially on line 3—3 of said figure.

Figure 4 is a side elevation, in detail and enlarged, of the lower measuring mechanism shown in Figure 1.

Figure 5 is a vertical longitudinal sectional view through the mechanism of Figure 4, taken substantially on line 5—5 of said figure, and Figure 6 is an enlarged detail horizontal sectional view taken substantially on line 6—6 of Figure 5.

Referring now particularly to Figure 1, portions of an oil well derrick are shown at 10, the floor line of the derrick being indicated at 11 and the usual rotary table at 12. The pipe string, which may be drill pipe or tubing is shown with an upper stand 13 above the floor line 11 in the position it will usually assume when the string is elevated preparatory to disconnection of said stand 13, or preparatory to lowering of the string immediately after connection of said stand to the upper end of the string.

In the above position, which is the position for measurement according to the present invention, and in which the string is usually supported by an elevator 14 shown engaged with its upper end in a manner exposing the upper extremity of its upper box collar 15 within the elevator bail 16, it is to be understood the string hangs from the elevator freely through the rotary table 12 so that the stand 13 is under full stretch caused by the weight of that position of the string depending therefrom and therebelow. Thus the stand 13 is shown as attached at its lower pin end or collar 17 to the string so that the lower extremity of said collar 17 plainly appears above the rotary table in its coupled relation to the upper box end or collar 18 of the next lowermost stand 19 of the string.

For the purposes of the present invention there is suitably connected to, and supported by, the derrick 10, an upper mechanism generally indicated at 20, including means whereby a vertically adjustable measuring element may be positioned in precisely horizontal level with the upper extremity of collar 15 at the upper end of pipe stand 13, and at the same time control and position a measuring line 21 of known length so that the lower end of said line, preferably equipped with a lower measuring tape 22, is correspondingly positioned relative to the lower measuring mechanism generally indicated at 23.

The lower mechanism 23 similarly includes a measuring element which is vertically adjustable relative to the measuring tape 22, to be positioned in precisely horizontal level with the lower extremity of collar 17 where it joins the upper collar 18 of the next lowermost stand 19. This lower measuring element is equipped with an indicator to cooperate with tape 22 which is graduated therealong for a substantial distance so that there will be ample compensation at the lower measuring station for adjustments at the upper station to accord with the varied vertical positions of the pipe stand 13 above the derrick floor.

It will be understood, of course, that the measuring line or cable 21 and its lower tape 22 will be of a definite known length, for example, ninety feet from the upper mechanism to approximately the center of the tape 22, which latter is graduated for a number of feet above and below its ninety-foot mark, preferably in tenths of inches.

It will be seen that, for its better protection, the measuring line 21 may extend down through the derrick within a protecting pipe or sheath 25 connected in any suitable manner to the derrick and in which the line is freely movable.

Referring now more specifically to the upper station and the upper measuring mechanism 20 which is best seen in Figures 2 and 3, it will first be noted from Figure 1 that this mechanism is mounted on the derrick 10 above the derrickman's platform 24. Steps 24a on the derrick provide for easily and conveniently reaching all parts of this mechanism. As more plainly shown in Figures 2 and 3, a vertically adjustable support 26 is slidably mounted on an upright bar or beam 27. From the upper and lower ends of this bar or beam 27, lateral connecting struts 28 and 29 project for mounting the same in a truly vertical position relative to, and upon an adjacent inclined portion of the derrick 10.

For the above purpose each of the struts 28 and 29 has a pivotally supported end attaching foot 30 connected thereto by a clamping bolt 31, and adapted to be bolted or otherwise connected to the derrick. Each strut, of which the upper strut 28 is substantially shorter, as a whole, than the lower strut 29, is in sections threadedly connected by an adjusting collar or sleeve 32. It thus becomes an easy matter to adjust and mount the bar or beam 27 upon, and relative to, the derrick so that it stands in a truly vertical position.

The support 26 which slidably embraces the bar or beam 27 carries a sighting telescope 33 at one side, preferably of the nature of a telescope sight for firearms with at least a horizontal wire for accurate aligning with the objective, which is the upper end of stand collar 15, as seen in Figure 1. This telescope as seen in Figure 2, is intermediately pivoted for vertical swinging adjustment at one side of the support 26 between the upper and lower ends of the latter, and carries a spirit level 34 in order that it may be accurately checked and controlled to assure a truly horizontal position in use. Below the telescope 33 the support 26 is slotted, with ears at opposite sides of the slot to pivotally support a cam head clamp 35 by which the support may be securely clamped in position when adjusted to a position horizontally level with the upper end of stand collar 15 as determined by view through the telescope 33. Opposite the clamp 35, an outstanding ear 36 provides for permanent connection of the upper end of measuring line 21, and above the telescope 33, an upstanding ear 37 provides for connection of the lower end of a counterbalancing line 38. This latter line extends upwardly to the upper end of bar 27 and downwardly over a guide roller 39, the bar preferably being hollow so as to receive the line 38 and also house a counterbalancing weight 40, as seen in Figure 3, to which said line is connected. This arrangement counterbalances the weight of the measuring line and facilitates vertical, manual adjustment of the sighting support 26 and telescope 33.

The measuring line 21 depends from sighting support 26 around a guide roller 41 at the lower end of bar or beam 27 and, as before stated, proceeds downwardly through the protecting sheath 25 to the lower station or measuring mechanism 23, connecting at its lower end to the upper end of the graduated tape 22 which, as better seen in Figures 4 and 5, depends in guided relation vertically along the lower station, with a small weight 42 at its lower end for insuring a hanging tautness vertically along said mechanism in a position relative thereto which will shortly appear.

It will be noted from Figures 1, 4, 5 and 6, that the lower measuring mechanism is, in its material respects, the same as the upper mechanism, its supporting frame including an upright beam or bar 43, with lateral upper and lower attaching struts 44 and 45 of sectional construction for adjustment purposes, and pivoted attaching feet 46, all substantially the counterparts of elements 27 to 32, inclusive, of the upper mechanism previously described.

A similar telescope 47 is similarly movably attached to a support 48 slidably disposed on upright 43, with a level 49 and the said support 48 may carry a cam clamp 50 for securing the same in adjusted position when the lower end of pipe collar 17 has been properly sighted. Unlike the upper mechanism, however, the support 48 has no connection with measuring tape 22 which depends, along upper and lower guide rollers 51 and 52, in spaced parallel relation to bar 43.

The support 48, in this instance, has an indicating pointer or arm 53 which closely approaches the tape 22 and cooperates with its graduations as plainly seen by a comparison of Figures 5 and 6. The lower support 48 needs no counter balance since it carries only the telescope 47 and clamp 50 and may thus be easily adjusted and positioned.

In operation, let it be assumed the pipe string has been elevated to the position shown in Figure 1, with the upper stand 13 completely above the derrick floor 11. While the string is hanging freely, or in other words before slips are set in the rotary table 12 to anchor stand 13, the derrickman sights the upper end of stand collar 15 through telescope 33 of the upper mechanism, raising or lowering support 26, as the case may be, for this purpose, and thus correspondingly raising or lowering the measuring line 21 and tape 22 relative to the lower mechanism. Upon signal from the derrick man that the upper mechanism has been properly sighted along the broken line 54 of Figure 1, an operator on the derrick platform 11 then adjusts the lower support 48 and properly sights the same along the broken line 55 of Figure 1. The indicator 53 is then opposite a graduation of tape 22 as seen in Figure 5, which denotes the full length of the stand 13 while hanging under stretch caused by the weight of the string below the same.

For the above purposes the lower telescope or sighting support need not be clamped but a clamp is provided in case it is desired to hold the lower telescope support in sighting position for a time.

By thus accurately measuring the full length of each pipe stand going into, or coming out of, the hole, in the stretched condition in which it hangs in the hole in use, the full length, and the actual length, of the string in use may be easily computed, and the operator may be accurately informed at all times just what position the lower end of the string occupies in the hole below the surface of the ground. This is a great advantage in many oil well operations, including drilling, and accuracy in setting tubing in many instances, becomes the controlling factor as between success and failure of such operations.

Having thus fully disclosed the invention, what is claimed is:

1. An apparatus supported by, and within, an oil well derrick for measuring lengths or stands of a freely hanging pipe string as said stands are successively positioned above ground within the derrick, said apparatus including upper and lower sighting supports, means attached to the derrick and upon which said sighting supports are independently vertically adjustable, means carried by said supports for respectively sighting the upper and lower ends of such stands, whereby the said supports may be positioned in true horizontal alignment with the said stand ends, means forming a measuring line fixed at its upper end to, and vertically adjustable with, the upper sighting support and having a lower graduated section depending past, and freely of, the lower sighting support, and indicator means carried by the lower sighting support and cooperating with the said graduated portion of the measuring line.

2. An apparatus supported by, and within, an oil well derrick for measuring lengths or stands of freely hanging pipe string as said stands are successively positioned above ground within the derrick, said apparatus including upper and lower sighting supports, means attached to the derrick and upon which said sighting supports are independently vertically adjustable, means carried by said supports for respectively sighting the upper and lower ends of such stands, whereby the said supports may be positioned in true horizontal alignment with the said stand ends, means forming a measuring line between said sighting supports, and fixed at one end to one of said supports, having its other end graduated and extending freely along the path of adjusting movement of the other support, and indicator means carried by the latter support and cooperating with the said graduated portion of the measuring line.

3. In combination with an oil well derrick, a pipe measuring apparatus including support-forming means fixed at vertically spaced points in said derrick and presenting vertically disposed guides, sighting members independently vertically adjustable on said guides and each including a telescopic sighting element positioned horizontally therein, means arranged between said sighting members and forming a measuring line connected at one end thereof to one of said members and having its opposite end portion graduated and extending along the path of adjustable movement of the other member, and means carried by the latter member and forming an indicator cooperating with the said graduated portion of the measuring line.

4. In combination with an oil well derrick, a pipe measuring apparatus including support-forming means fixed at vertically spaced points in said derrick and presenting vertically disposed guides, sighting members independently vertically adjustable on said guides and each including a telescopic sighting element positioned horizontally therein, means arranged between said sighting members and forming a measuring line connected at its upper end to the upper sighting member and having a lower graduated end portion positioned along the path of adjusting movement of the lower sighting member, and indicator means carried by the lower sighting member and cooperating with said graduated portion of the measuring line.

5. In combination with an oil well derrick, a pipe measuring apparatus including support-forming means fixed at vertically spaced points in said derrick and presenting vertically disposed guides, sighting members independently vertically adjustable on said guides and each including a telescopic sighting element positioned horizontally therein, means arranged between said sighting members and forming a measuring line connected at its upper end to the upper sighting member, for movement with the latter in its adjustments, and having a graduated lower end portion, means in connection with the upper sighting member and counterbalancing the weight of the measuring line attached thereto, and indicator means carried by the lower sighting member and cooperating with the lower graduated portion of said measuring line.

6. In combination with an oil well derrick, a pipe measuring apparatus comprising means anchored on the derrick at vertically spaced points thereof including vertically disposed guide bars and connections between said guide bars and the derrick adjustably holding said bars in truly vertical positions, sighting supports independently vertically adjustable on said bars, telescopic sighting elements adjustably in connection with said supports for truly horizontal positioning, each element having a leveling instrument, a measuring line connected at its upper end to the upper sighting support and having its lower end portion graduated and depending along the path of vertical adjustment of the lower support, means attached to the derrick and forming a guide for the intermediate portion of the measuring line, means carried by the upper sighting support for clamping the same in adjusted position to its guide, and means carried by the lower sighting support and forming an indicator cooperating with the lower graduated portion of the measuring line.

7. In combination with an oil well derrick, a pipe measuring apparatus comprising means anchored on the derrick at vertically spaced points thereof including vertically disposed guide bars and connections between said guide bars and the derrick adjustably holding said bars in truly vertical positions, sighting supports independently vertically adjustable on said bars, telescopic sighting elements adjustably in connection with said supports for truly horizontal positioning, each element having a leveling instrument, a measuring line connected at its upper end to the upper sigrhting support and having its lower end portion graduated and depending along the path of vertical adjustment of the lower support, means connected to the upper sighting support and counterbalancing the weight of the measuring line depending therefrom, means attached to the derrick and forming a guide for the intermediate portion of the measuring line, means carried by the upper sighting support for clamping the same in adjusted position to its guide, and means carried by the lower sighting support and forming an indicator cooperating with the lower graduated portion of the measuring line.

8. In combination with an oil well derrick, a pipe measuring apparatus including horizontally positionable telescopic sighting elements vertically adjustably mounted in the upper and lower portions of the derrick, a measuring line connected at its upper end to the upper sighting element and adjustable with the latter relative to the lower element, guide means for said measuring line below the upper sighting element and adjacent to the lower sighting element, the lower portion of said line being graduated, and indicator means carried by the lower sighting element and cooperating with the graduated lower portion of the measuring line.

WALTER A. ABEGG.